(12) United States Patent
Finkelstein et al.

(10) Patent No.: US 7,792,868 B2
(45) Date of Patent: Sep. 7, 2010

(54) DATA OBJECT LINKING AND BROWSING TOOL

(75) Inventors: Charles A. Finkelstein, Woodinville, WA (US); Dean Rowe, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 210 days.

(21) Appl. No.: 11/558,869

(22) Filed: Nov. 10, 2006

(65) Prior Publication Data

US 2008/0115083 A1 May 15, 2008

(51) Int. Cl.
*G06F 17/30* (2006.01)
(52) U.S. Cl. .............. 707/798; 707/737; 707/749; 707/754; 707/802
(58) Field of Classification Search .......... 707/1, 707/3, 6, 100, 101, 102, 999.007, 999.101, 707/999.102, 999.107; 715/805, 854
See application file for complete search history.

(56) References Cited

U.S. PATENT DOCUMENTS

| | | | |
|---|---|---|---|
| 5,832,495 A | 11/1998 | Gustman | |
| 6,366,296 B1 | 4/2002 | Boreczky et al. | |
| 6,486,898 B1 * | 11/2002 | Martino et al. | 715/853 |
| 6,956,593 B1 | 10/2005 | Gupta et al. | |
| 7,131,059 B2 | 10/2006 | Obrador | 715/209 |
| 7,149,983 B1 | 12/2006 | Robertson et al. | |
| 7,184,959 B2 * | 2/2007 | Gibbon et al. | 704/270 |
| 7,224,362 B2 * | 5/2007 | Kincaid et al. | 345/440 |
| 7,509,321 B2 * | 3/2009 | Wong et al. | 707/7 |
| 7,533,124 B2 * | 5/2009 | Hellman et al. | 707/103 R |
| 7,540,051 B2 * | 6/2009 | Gundersen et al. | 707/5 |
| 2002/0193895 A1 | 12/2002 | Qian et al. | |
| 2003/0009469 A1 | 1/2003 | Platt et al. | |
| 2003/0018607 A1 | 1/2003 | Lennon et al. | |
| 2003/0151618 A1 | 8/2003 | Johnson et al. | |
| 2003/0233460 A1 | 12/2003 | Drucker et al. | |
| 2004/0133605 A1 | 7/2004 | Chang et al. | |
| 2004/0143590 A1 | 7/2004 | Wong et al. | |
| 2004/0143598 A1 | 7/2004 | Drucker et al. | |
| 2004/0143604 A1 | 7/2004 | Glenner et al. | |
| 2004/0177319 A1 | 9/2004 | Horn | |
| 2004/0225635 A1 | 11/2004 | Toyama et al. | |
| 2004/0268224 A1 | 12/2004 | Balkus et al. | |
| 2005/0075917 A1 * | 4/2005 | Flores et al. | 705/8 |
| 2005/0097120 A1 * | 5/2005 | Cooper et al. | 707/102 |
| 2006/0069998 A1 | 3/2006 | Artman et al. | |

(Continued)

OTHER PUBLICATIONS

Foote et al., "An Intelligent Media Browser using Automatic Multimodal Analysis," Multimedia '98, ACM Press, 1998, pp. 375-380., Sep. 14, 1998, located at http://www.fxpal.com/publications/FXPAL-PR-98-091.pdf.

(Continued)

*Primary Examiner*—Tim T. Vo
*Assistant Examiner*—Dangelino N Gortayo
(74) *Attorney, Agent, or Firm*—Senniger Powers LLP

(57) ABSTRACT

A method of linking data objects, such as video objects, image objects, and audio objects, and displaying data associated with the data objects based upon the strength of the relationship between the data objects. Another method for navigating a data collection of data objects by linking groups of data objects based upon related metadata is also disclosed. A user interface including the data associated with the grouped data objects facilitates browsing the data collection of data objects.

16 Claims, 7 Drawing Sheets

U.S. PATENT DOCUMENTS

2006/0161867 A1    7/2006  Drucker et al.
2007/0255755 A1*  11/2007  Zhang et al. ............. 707/104.1
2007/0282908 A1*  12/2007  Van der Meulen et al. ............................................................. 707/104.1

OTHER PUBLICATIONS

Foote et al., "Enhanced Video Browsing using Automatically Extracted Audio Excerpts", Proceedings IEEE International Conference on Multimedia and Expo, Lausanne, Switzerland, Aug. 26, 2002, located at http://www.fxpal.com/people/cooper/Papers/icme02-1.pdf.

Morang, et al., "Infolink: Analysis of Dutch Broadcast News and Cross-Media Browsing", Department of Electrical Engineering, Mathematics and Computer Science, University of Twente, The Netherlands, Multimedia and Expo, ICME 2005, IEEE International Conference, Jul. 6-8, 2005, pp. 1582-1585, The Netherlands.

Pang et al., "Challenges of Networked Media: Integrating the Navigational Features of Browsing Histories and Media Playlists into a Media Browser", 2004, pp. 480-483, ACM Press, New York, located at http://delivery.acm.org/10.1145/1030000/1027643/p480-pang.pdf?key1=1027643&key2=8732015511&coll=GUIDE&dl=GUIDE&CFID=608554&CFTOKEN=45220384.

Ullmer et al., "mediaBlocks: Physical Containers, Transports, and Controls for Online Media", 1998, ACM Press, New York, US, located at http://tangible.media.mit.edu/content/papers/pdf/mediaBlocks__SG98.pdf.

* cited by examiner

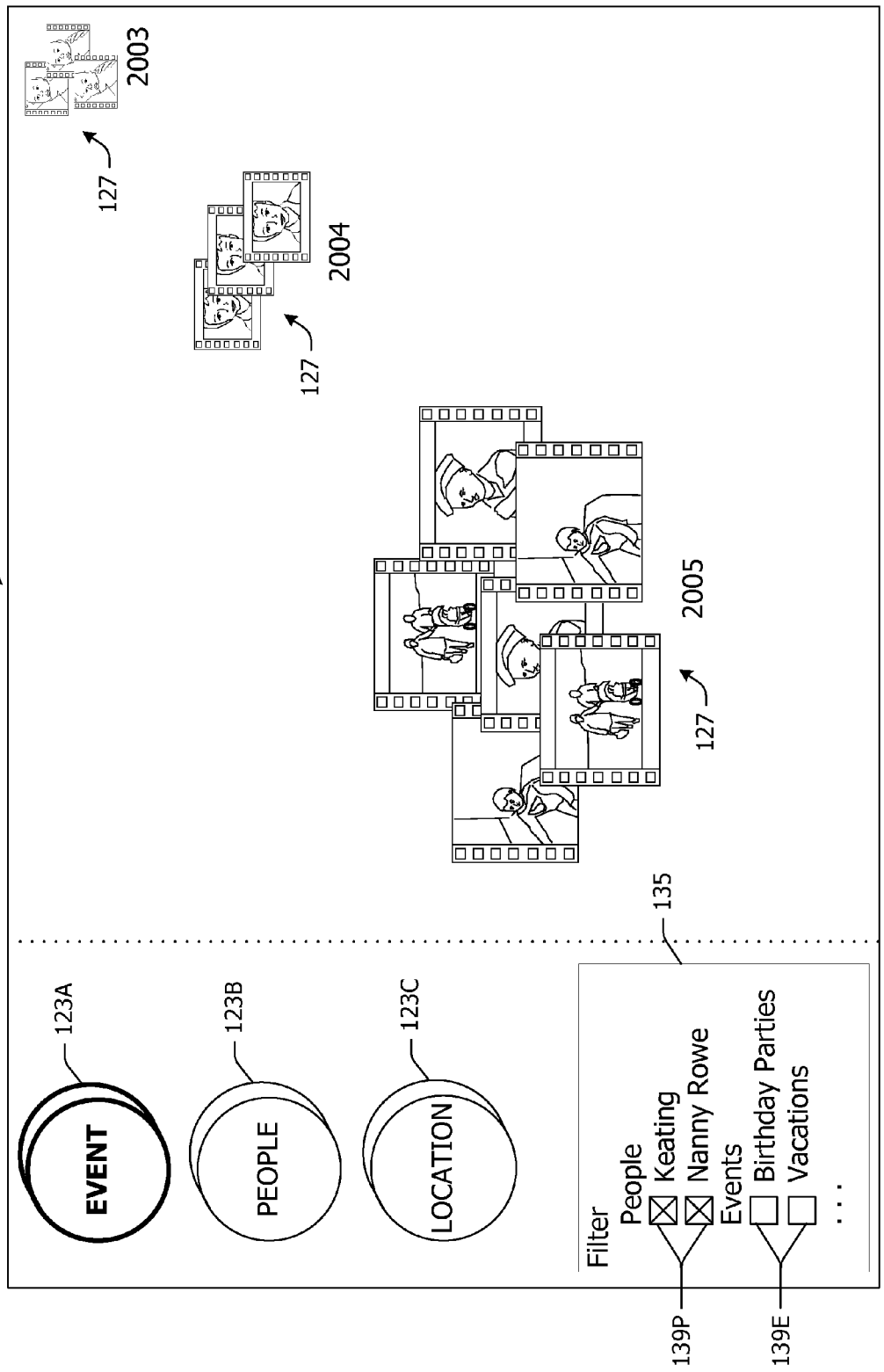

DATA OBJECT LINKING AND BROWSING TOOL

BACKGROUND

Users of almost all types and skill levels need to be able to readily find and access data objects, such as media objects and information objects. The need exists for both sophisticated and novice users, as well as large and individual users. Presently, hierarchical displays of such data objects are common. For example, directories with folders are a common tool for storing and retrieving data objects. These directories are useful when they are organized properly and the user searching for a particular object knows exactly what object is needed and where that object is located. But on many occasions, a user may not know the exact location or identity of the object he seeks. He may have forgotten, or he may not be the architect of the directory system, so that he does not know where to look.

To combat this typical problem, conventional systems provide search tools for users that facilitate searching for and locating particular objects and files. For example, a user may search for a data object by any number of data object properties, including keyword, filename, modification date, save date, data object size, data object location, and the user modifying the data object, among others. These search tools are useful, but can still fail to locate particular data objects. For example, a user may fail to find a particular object because he selects the wrong keyword or the data object itself is improperly named.

Moreover, directory and search tools may also fail because the user may not know exactly what he is looking for. A user, for example, may be creating a digital media presentation on his computing device. As part of that process, the user plans on including several media objects, including image files, video files, and audio files. The user may need to pull media objects from several different storage areas in order create a satisfying presentation. In some cases, the user may not even know what media objects will be used when starting the project. The user may have a general idea of the topic of the presentation and may be aware that media objects related to that topic are stored on his computing device, without having an exact outline of which media objects will be used. Because conventional search tools require a relatively specific search criteria (e.g., filename, modification date, etc.), it can be difficult to locate specific files of unknown name or origin. A user may know that related songs exist as audio files and related images exist as image files, but may be unable to readily locate them.

Unfortunately, such conventional file directory and search systems are unable to adequately locate specific objects and provide information relating these objects to other related objects

SUMMARY

The following simplified summary provides a basic overview of some aspects of the present technology. This summary is not an extensive overview. It is not intended to identify key or critical elements or to delineate the scope of this technology. This Summary is not intended to be used as an aid in determining the scope of the claimed subject matter. Its purpose is to present some simplified concepts related to the technology before the more detailed description presented below.

Accordingly, aspects of the invention automatically provide connections between objects of a collection to facilitate user browsing and location of objects within the collection related to other objects in the collection. These connections provide specific guidance to a user regarding potentially-related objects, while allowing the user to maintain substantial control of the browsing process. By providing useful connections between objects of a collection, the user can readily browse through a collection of objects based upon connections between objects, thereby providing a way for not otherwise related objects to be linked to one another by the user. Aspects of the invention provide a way to automatically create a visual depiction of such links between potentially related data that demonstrate those data objects most likely to provide a suitable relation.

BRIEF DESCRIPTION OF THE DRAWINGS

FIG. 2A is yet another exemplary user interface of another embodiment of the invention;

Corresponding reference characters indicate corresponding parts throughout the drawings.

DETAILED DESCRIPTION

User Interface

Figure 1A:
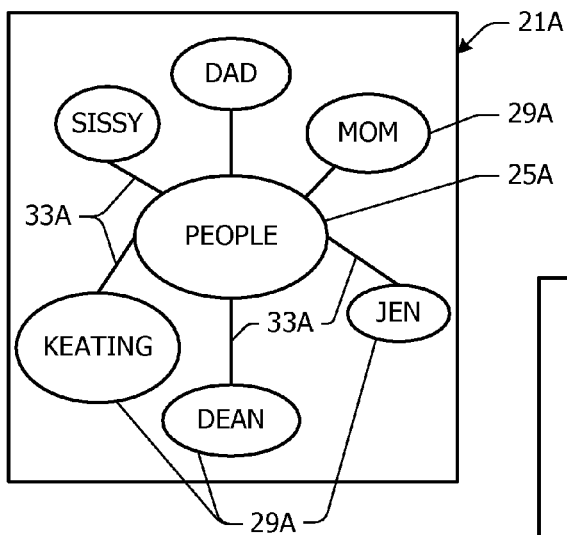
FIGS. 1A-1E depict exemplary user interfaces of one embodiment of the invention.
Figure 1B:
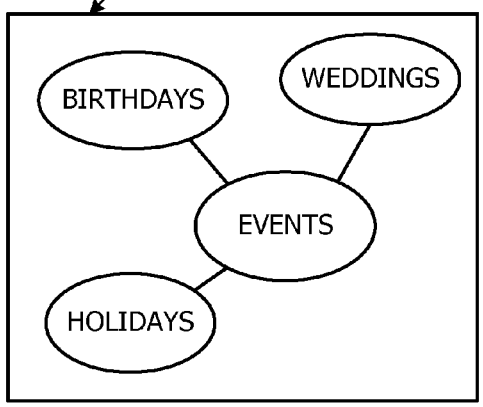
Figure 1C:
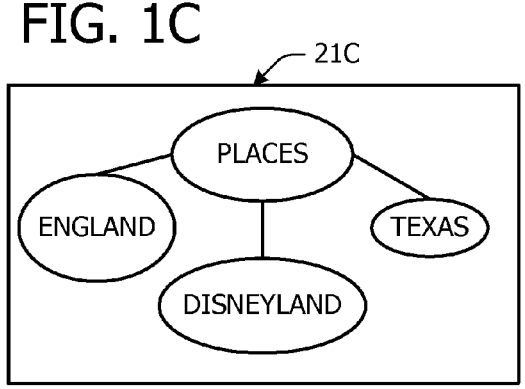
Figure 1D:
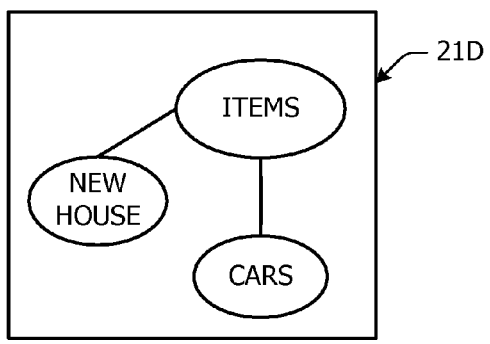
Figure 1E:
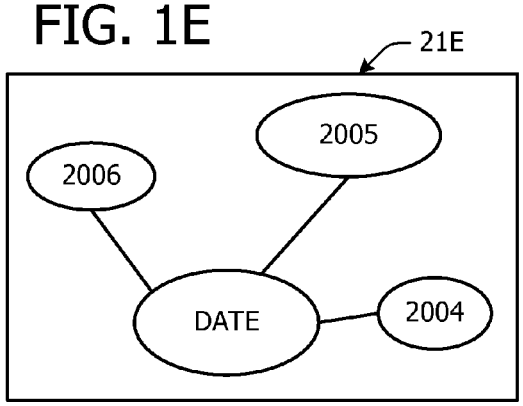

Referring now to FIGS. 1A-1E, several exemplary user interfaces, each generally indicated 21A-21E, collectively 21, are depicted for displaying data associated with a portion of data objects of a data collection of data objects. Such a data collection of data objects may be located on one device (e.g., a storage device) or among several devices able to communicate with one another. Generally, the user interfaces 21 may be utilized with data collections organized in any fashion. For example, the data collection may be stored in a memory area of a computing device according to a directory format, a database format, or in an unorganized fashion. The present user interface is adapted for providing useful access to any such data collections. These data collections of data objects can contain various objects, including text files, audio files, video files, image files, and database files, among others.

The data collection can also include various types of metadata associated with each of the data objects. The source of such metadata can vary from one data object to another. For example, some of the metadata may be automatically generated, such as through normal file operations. This metadata can include file names, modification and save dates and times, file size, and file owner identification, among others. Generally, any metadata automatically generated and associated with particular data objects may be stored and utilized according to the embodiments of the invention. In another example, user-provided metadata may also be utilized to identify a particular data object. This metadata can also take many forms, such as user notes, user storage (e.g., directory structure), and user-defined attributes, among others. In still another example, metadata may be generated from the data objects themselves. According to known methods, data objects of the type contemplated herein may be analyzed to extract metadata associated with the data objects. For example, the content of audio and video files may be analyzed to determine various attributes that can function as metadata, as would be readily understood by one skilled in the art.

Referring again to FIG. 1A, the first depicted user interface 21A comprises a primary selection element 25A associated with a selected group of data objects of the data collection. In this example, the primary selection element 25A is associated with the group "PEOPLE." The user interface 21A also comprises secondary selection elements 29A associated with the other groups of data objects of the data collection. Each of the secondary selection elements 29A is displayed in a manner visually depicting the relative strength of the association of its data objects with the data objects of the selected group of data objects depicted by the primary selection element 25A. Thus, for the example of FIG. 1A, the secondary selection element 29A identified by "KEATING" relates to data objects most associated with the primary selection element 25A. This is visually apparent due to the larger size of the secondary selection element 29A associated with "KEATING," as compared with the secondary selection elements associated with the other groups of data objects identified as "SISSY," "DAD," "MOM," "DEAN," and "JEN." Because the relative strength of each group of data objects is displayed visually, a user can quickly scan the user interface 21A to determine the relative relationship between each of the data groups associated with the secondary selection elements 29A and the data group associated with the primary selection element 25A. Because each of the secondary selection elements is labeled, the user retains control over which of the groups of data objects he wishes to explore.

In the example shown, the secondary selection element 29A identifiers ("SISSY," "DAD," "MOM," "DEAN," and "JEN") are subsets of the primary selection element 25A identifier, "PEOPLE." This example should not be construed as limiting, but is merely one way for organizing such groups of data objects. It should also be understood that although these groups of data objects associated with the selection elements 25A, 29A are shown in the user interface 21A as linked to one another, the data items are not likely linked to one another where they are actually stored. For example, although the secondary selection elements 29A all relate to specific people, data objects relating to those people may be scattered among several different storage locations on several different computing devices and/or networks. As would be readily understood by one skilled in the art, computing device (s) comprising processors, memories, (either system, remote, and/or removable), input devices (or user interface selection devices such as a keypad or pointing device), a display, and a connection to one or more networks may be utilized to manage such a data collection. As such, the user interface 21A provides an integrated user interface for collecting all of those data objects together. Thus, while the relatively straightforward relationships between the primary selection element 25A and the secondary selection elements 29A provide comfort and familiarity to the user, the relationships are more powerful than expected due to the scope of data objects associated with each selection element. Moreover, the selection element identifiers can demonstrate a wide variety of relationships, beyond category and subcategory, without departing from the scope of the embodiments of the invention. Further processes resulting from the selection of one of the selection elements 25A, 29A associated with the data groups will be discussed in greater detail below with respect to the embodied methods of the invention. Methods for determining the relative strength of the association of data objects are also discussed in greater detail below.

The user interface 21A further comprises links 33A between the selection elements 25A, 29A displayed in a manner visually depicting at least one relationship defined by the link. In the examples depicted in FIGS. 1A-1E, the links demonstrate the relationship between the data objects associated with the primary selection element 25A and the data objects associated with the respective secondary selection elements 29A. In still another exemplary embodiment of the invention, the links 33A between the groups of data objects can be displayed in a manner visually depicting further information regarding the links themselves. For example, the relative strength of the links or the rationale for the links between the groups of data objects can be depicted, such as through the color, size, length, orientation, and style of the link. In yet another exemplary embodiment, a parameter independent of the basis for the links themselves can be included. For instance, the links may be established due to the similarity of metadata of the data objects, but the visual depiction of the links may illustrate another feature entirely. For example, the length of the link depicted can depict the average difference in time between when the data objects in one group were first collected or saved and when the data objects in the linked group were first collected or saved.

FIGS. 1B-1E depicts several other user interfaces 21B-21E similar to the user interface 21A of FIG. 1A described above. Such user interfaces 21B-21E also include primary selection elements 25, secondary selection elements 29, and links 33, generally as set forth above. As would be readily understood by one skilled in the art, many other user interfaces with different identifiers and linking structures could be constructed without departing from the scope of the embodiments of the present invention.

Figure 2:
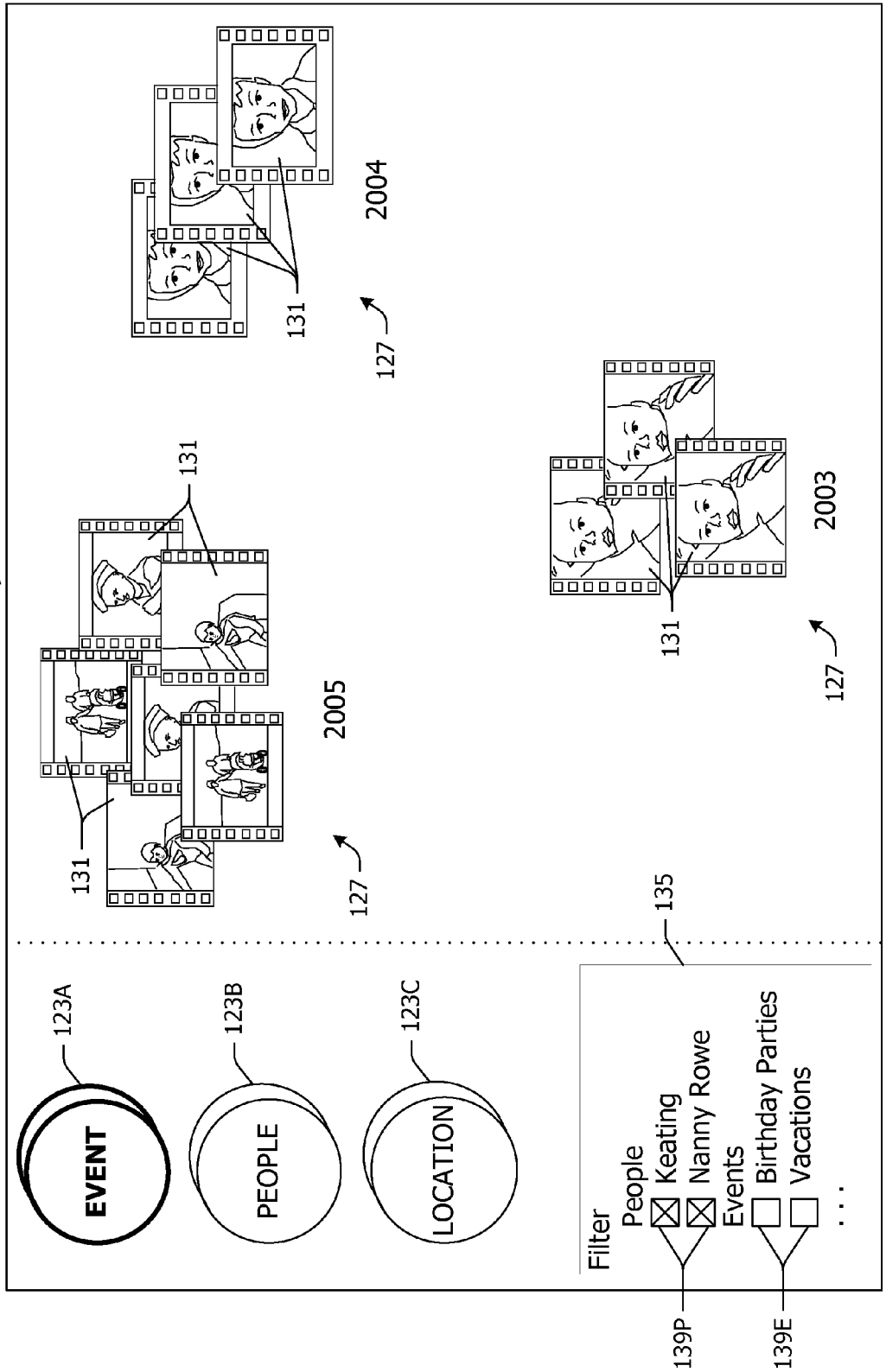
FIG. 2 is another exemplary user interface of another embodiment of the invention.

Turning to FIG. 2, a user interface of still another exemplary embodiment is generally depicted at 121. Here, the user interface includes three categorical selection elements 123A-123C. In the example shown, the categorical selection elements 123A-123C include "EVENT," "PEOPLE," AND "LOCATION." The "EVENT" categorical selection element 123A is depicted as selected, which in turn displays data, generally indicated 127, associated with groups of data objects related to events. Selection of one of the other categorical selection elements 123B, 123C would similarly display data associated with groups of data objects related to people and locations, respectively. In the example shown, the data 127 associated with the data objects is grouped into clusters according to years 2003, 2004, and 2005. Other nontemporal clustering schemes related to events, such as the season of the year when the event occurred (e.g., winter, spring, summer, or fall) or the subject of the event (e.g., religious holidays, birthdays, celebrations, vacations, etc.) could also be used as a basis for clustering without departing from the scope of the embodiments of the invention.

For the data 127 clusters depicted in FIG. 2, several thumbnails 131 of images are depicted as exemplary data associated with the data objects. Each of the data 127 clusters represents multiple data objects, so thumbnails associated with some or all of the data objects of the group can be depicted in the user interface 121. In the present example, image files are the data objects clustered in the user interface 121, so the addition of thumbnails allows the user to readily ascertain the contents of each cluster of data. In one example, selection of any portion of the cluster of thumbnails selects the group of data objects for further review by the user, such as with an alteration to the user interface 121 to further magnify the contents of the data group. In another example, selection of any particular thumbnail of the data group will provide access to the data object itself. In either example, the user can readily determine which of the groups of data objects may contain data objects useful to the user.

The user interface 121 further includes a filter selection element 135 for allowing the user to further augment the data objects selected from the data collection for review with the user interface. The filter selection element 135 includes selection elements 139P grouped by people (e.g., "Keating" and "Nanny Rowe") and selection elements 139E grouped by events (e.g., "Birthday parties" and "Vacations"). In the example shown, selection elements 139P for people "Keating" and "Nanny Rowe" are selected, thereby directing the user interface 121 to only display data associated with data objects related to either Keating or Nanny Rowe. In other words, upon receiving a selection for a particular filter, only those filtered data objects associated with the filter criteria are selected for inclusion in the groups of data objects. This provides further control for the user in tailoring the data communicated via the user interface 121 to the user's needs. Thus, in this example, only thumbnails depicting Keating or Nanny Rowe are included in the user interface 121.

Were either or both of the Keating or Nanny Rowe selection elements deselected, further modifications to the user interface would occur, thereby including other thumbnails of data objects relating to events in each year, but not necessarily including Keating or Nanny Rowe. Similarly, selection of the event selection elements 139E (e.g., Birthday parties, Vacations, etc.) will gather and display data associated with data objects relating to the selected event. Moreover, selecting one or more people selection element 139P and one or more event selection element 139E will gather and display data associated with data objects relating to both the event and people selected. For example, selecting the "Keating" people selection element 139P and the "Vacations" event selection element 139E will gather and display data associated with data objects related to both Keating and vacations. For the example of digital images, thumbnails of Keating on vacation would be displayed in clusters. Those clusters can be organized according to year, as shown, or some other related criteria, like location, or climate zone, or associated co-vacationers. As would be readily understood by one skilled in the art, the filter selection elements themselves may be automatically generated based upon the data objects included in the data collection. For example, the most commonly recurring features of the data collection (e.g., popular names, events, text, etc.) may be utilized as filters. Through filters, the user interface 121 can facilitate reducing the number of data objects requiring review by the user, thereby speeding the data object search and selection process.

Referring now to FIG. 2A, a three-dimensional variation on the user interface 121 of FIG. 2 is shown. In this exemplary three-dimensional user interface, generally indicated 121A, the three data 127 groups are arranged in a chronological format along a time axis, whereby the 2005 grouping appears large and most prominent in the foreground, the 2004 grouping appears slightly less prominently, and the 2003 grouping appears small and least prominent in the background. In this manner, the user interface 121A can create the appearance of three-dimensions. The user can manipulate the user interface 121A with an input device (e.g., a mouse) to alter the orientation and perspective of the three-dimensional groupings. In the example shown, the user has turned the displayed view whereby the data 127 groups of thumbnails are spread out and grouped according to year. In addition, the user could also manipulate the user interface 121A to zoom up and zoom down the time axis, focusing in on different portions of the data 127. For example, the user interface 121A could be manipulated to depict the data 127 group of 2004 in the foreground, while depicting the 2003 and 2005 groups in the background. Moreover, other data axes in addition to or instead of the time axis can also be included. For example, data may be displayed with multiple axes, whereby the user may turn and manipulate those axes to depict different data 27 in the foreground and background, thereby providing a useful user interface.

Figure 3:
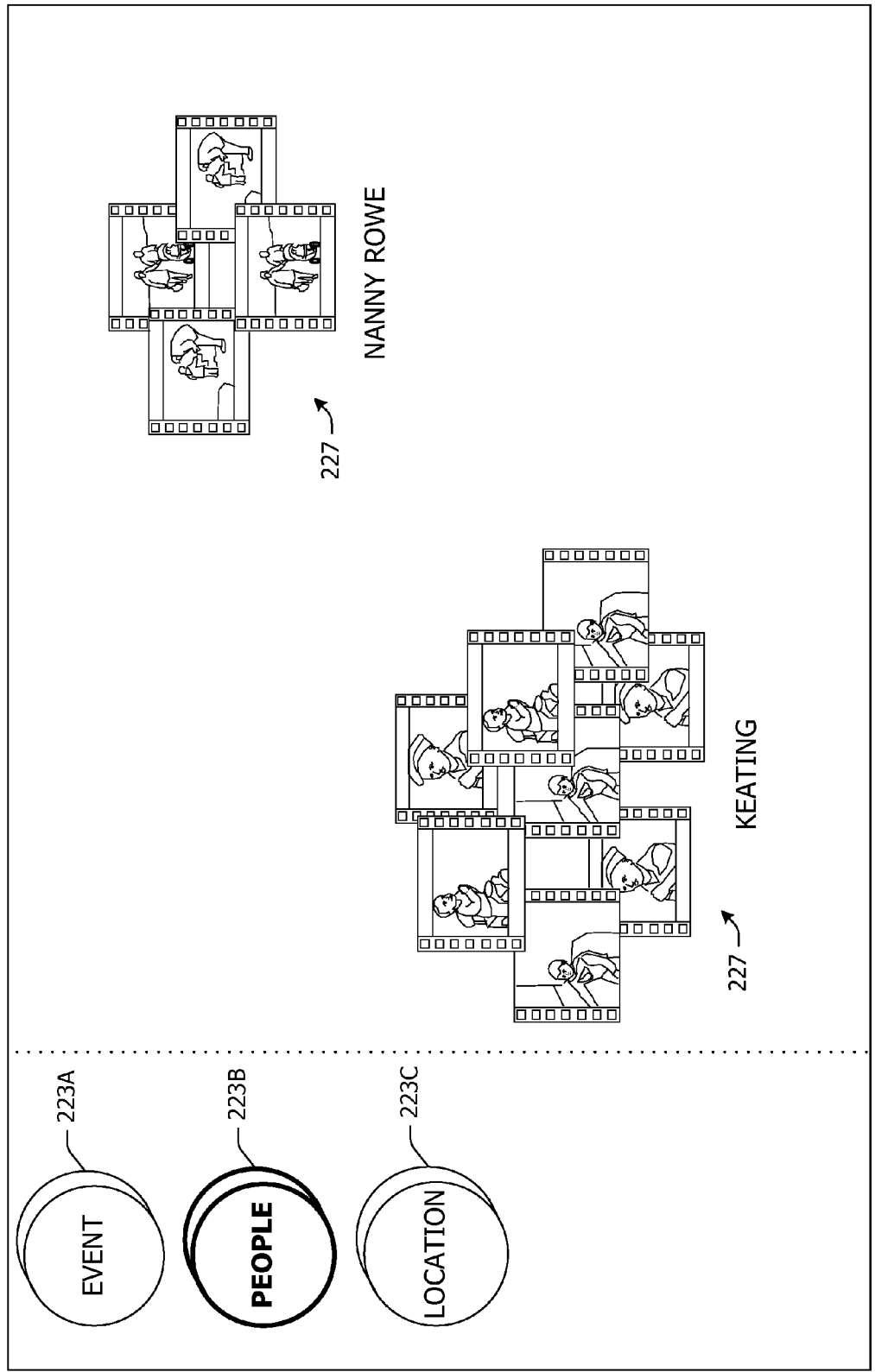
FIG. 3 is still another exemplary user interface of another embodiment of the invention.

Referring now to FIG. 3, a further exemplary user interface is generally depicted at 221. As with the previous user interfaces 21, 121, this user interface 221 includes the three categorical selection elements 223A-223C for each of events, people, and location. Here, the people category selection element 223B is selected, thereby providing data, generally indicated 227, associated with groups of data objects related to people. In particular, the data 227 associated with the data objects is grouped into clusters according to the identity of the people (e.g., Keating and Nanny Rowe). Other clustering schemes are also contemplated within the scope of embodiments of the present invention.

Method of Linking Data Objects

Figure 4:
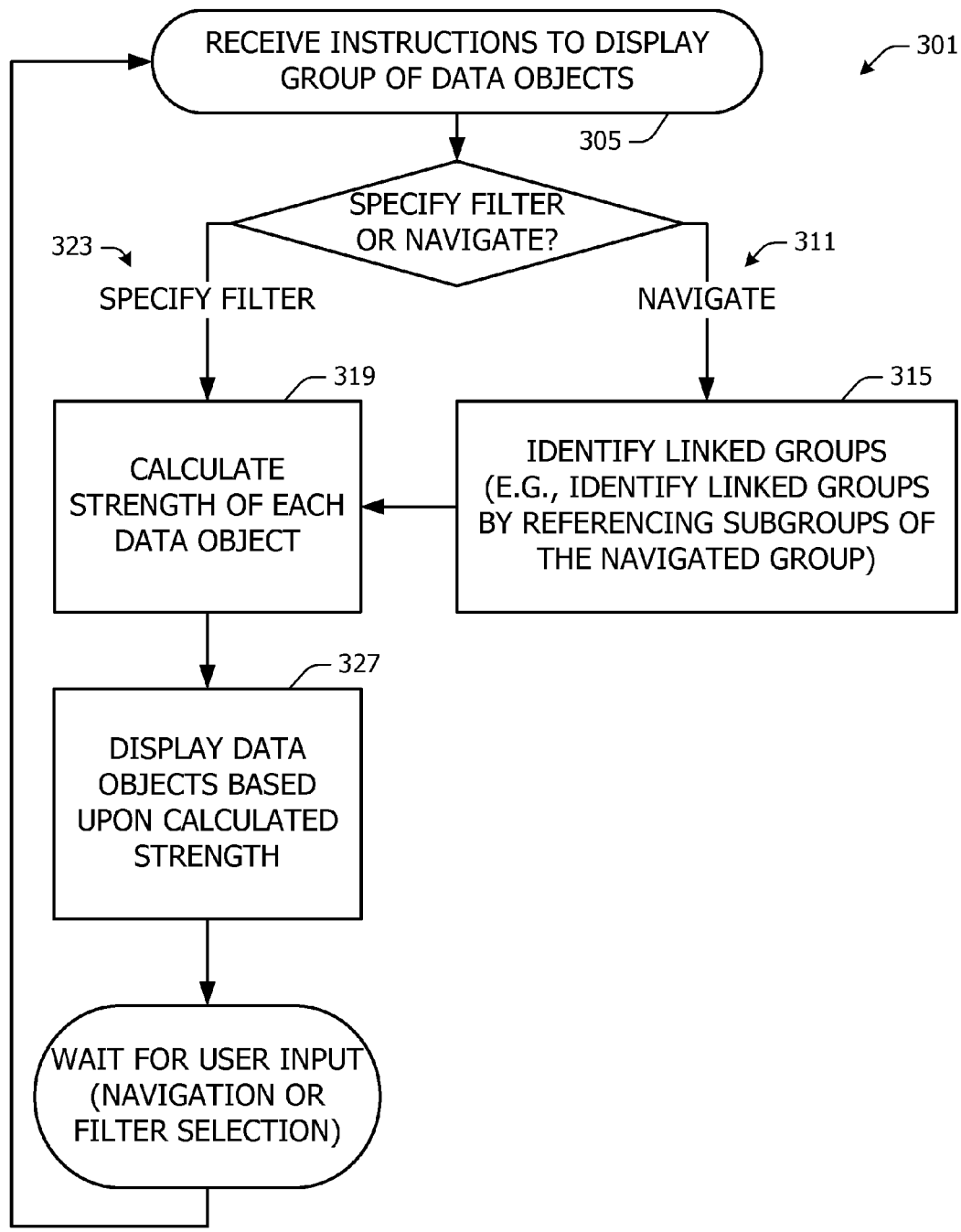
FIG. 4 is a flow diagram of a method of one embodiment of the invention.

Referring now to FIG. 4, a method of linking data objects of the data collection is generally indicated 301. The method comprises receiving, at 305, instructions to display a group of data objects of a data collection. As discussed above with respect to the user interfaces 21, 121, 221, such instructions to display a group of data objects can occur in a variety of ways. For example, the instructions can be in the form of instructions to navigate to a selected group of data objects or to specify a filter for filtering the data objects of the data collection.

In one exemplary embodiment, for example, such received 305 instructions to display a group of data objects of a data collection can be in the form of instructions to navigate, generally indicated at 311, to a selected group of data objects. With reference to the user interface of FIG. 1, for example, such received instructions to navigate 311 can include selecting a particular primary selection element 25A or secondary selection element 29A of the user interface. In the case of navigation to a group of data objects, the method 301 further identifies, at 315, one or more other groups of data objects of the data collection linked with the received 305 selected group of data objects that was the subject of the navigation 311. Such links can be identified 315 by comparing metadata associated with the data objects of the selected group of data objects with the metadata associated with the other data objects of the data collection. Useful metadata that can be the subject of such comparisons can take any number of forms. Virtually any metadata associated with a data object may be utilized in the comparison and identification to help determine linked groups of data objects. By utilizing a broad spectrum of metadata, links between groups of data objects can be established based upon many different parameters, as will be discussed in greater detail below with respect to another embodied method of the present invention.

In one alternative embodiment, the identifying 315 may further comprise identifying linked groups of data objects by referencing subject matter subgroups of the navigated group. In other words, where the navigated group includes logical subgroups (e.g., a "locations" data group includes groups of data objects related to particular locations), the method 301 may further identify 315 the logical subgroups strongly linked to the navigated group, if any. Utilizing such subject matter subgroups is not required, but may be used as another type of metadata by which comparison with the selected, or navigated, group of data objects may be achieved.

Once the method identifies 315 one or more other groups of data objects linked with the navigated group, the method 301 continues by calculating, at 319, a strength score associated with each of the data objects of the identified one or more other groups relative to each of the data objects of the selected group. For example, these calculated 319 strength scores can be strength of association scores assessing the strength of the association between the data objects of the linked group of data objects. The method can calculate 319 strength of association scores via any method known in the art, such as data clustering and Bayesian algorithms. These scores provide important information regarding the relative strength of association between one data object and another data object that are part of different groups of data objects and may otherwise not be thought of as related or linked under traditional hierarchical schemes, for example. Moreover, with such calculated 319 strength of association scores, the relation between one data object and an array of other data objects can be determined. In addition, the data objects of the linked group of data objects may be ranked according to their strength of association scores, thereby facilitating determination of the data objects most likely to be strong matches for the data objects of the navigated group. Other comparative scenarios are also contemplated as within the scope of embodiments of the present invention.

Beyond the navigation 311 model of data object selection discussed above, such received 305 instructions to display a group of data objects of a data collection can also be in the form of instructions to specify, generally at 323, a filter for filtering the data objects of the data collection. Referring back to FIG. 2, an exemplary filter selection element 135 is depicted, which functions in accordance with the filter specification 323 described here. The filter selection element 135 allows for selection of a group of data objects via filtration of the data objects of the data collection, rather than by navigation 311 to a particular group of data objects. For example, specifying a filter associated with a particular event (e.g., the "Vacations" event selection element 139E of the user interface 121 of FIG. 2) will generate a data group of data objects associated with the event, even where those data objects are stored separately from one another.

Once the user specifies 323 the filter, the method 301 continues as above by calculating, at 319, a strength score associated with each of the data objects of the group of data objects selected by filtration and with each of the data objects associated with the linked groups of data objects.

With the strength scores, the method 301 continues by displaying, at 327, data associated with the data objects for linking the data objects of the data collection based upon the calculated 319 strength scores. Data associated with the data objects may be any type of data, including textual data, image data, sound data, and thumbnail data, among others. Where the data is readily observable by the user, such as images and video, reduced size versions of the data may be displayed without departing from the scope of embodiments of the invention.

In one further exemplary embodiment, the display 327 of data associated with the data objects further comprises displaying data associated with those data objects with the highest strength scores. For example, where a related group of data objects contained too many data objects to reasonably display data associated with each of them, only data associated with the data objects having the highest strength scores will be displayed.

Moreover, the data may be displayed 327 according the method 301 in a manner that facilitates browsing and consumption by the user. For example, the method 301 may display 327 the data associated with the data objects in clusters according to their respective group or filter (see FIGS. 2 and 3). Moreover, the method 301 can display 327 the strength scores of the data objects with a visual indicator associated with at least one of the groups, the filter, and the data objects. The visual indicators can invoke any number of different features to communicate information to the user. For example, the size of the visual indicator can be indicative of the calculated 319 strength score. Other features such as textual tags, color, and icons, among others, may also be used without departing from the scope of the embodiments of the invention.

In one further exemplary embodiment, the displaying 327 further comprises determining the size of the display where the data associated with the data objects will be displayed and displaying data associated with only those data objects that can be displayed upon the display according to a readability criteria. For example, a readability criteria may include a minimum font size as well as minimum spacing between displayed elements. Other criteria may also be utilized without departing from the scope of embodiments of the present invention.

In addition to the calculation 319 discussed above, the method 301 may also calculate 319 a selected group strength score based upon the combined strength of the data objects of the selected group of data objects. The method 301 can also calculate 319 a group strength score for each of the linked groups of data objects based upon the combined strength of the data objects associated with respective linked groups of data objects. These additional strength calculations may be further incorporated in to the displaying 327 to further direct users to related data objects.

Method for Navigating a Data Collection

Figure 5:
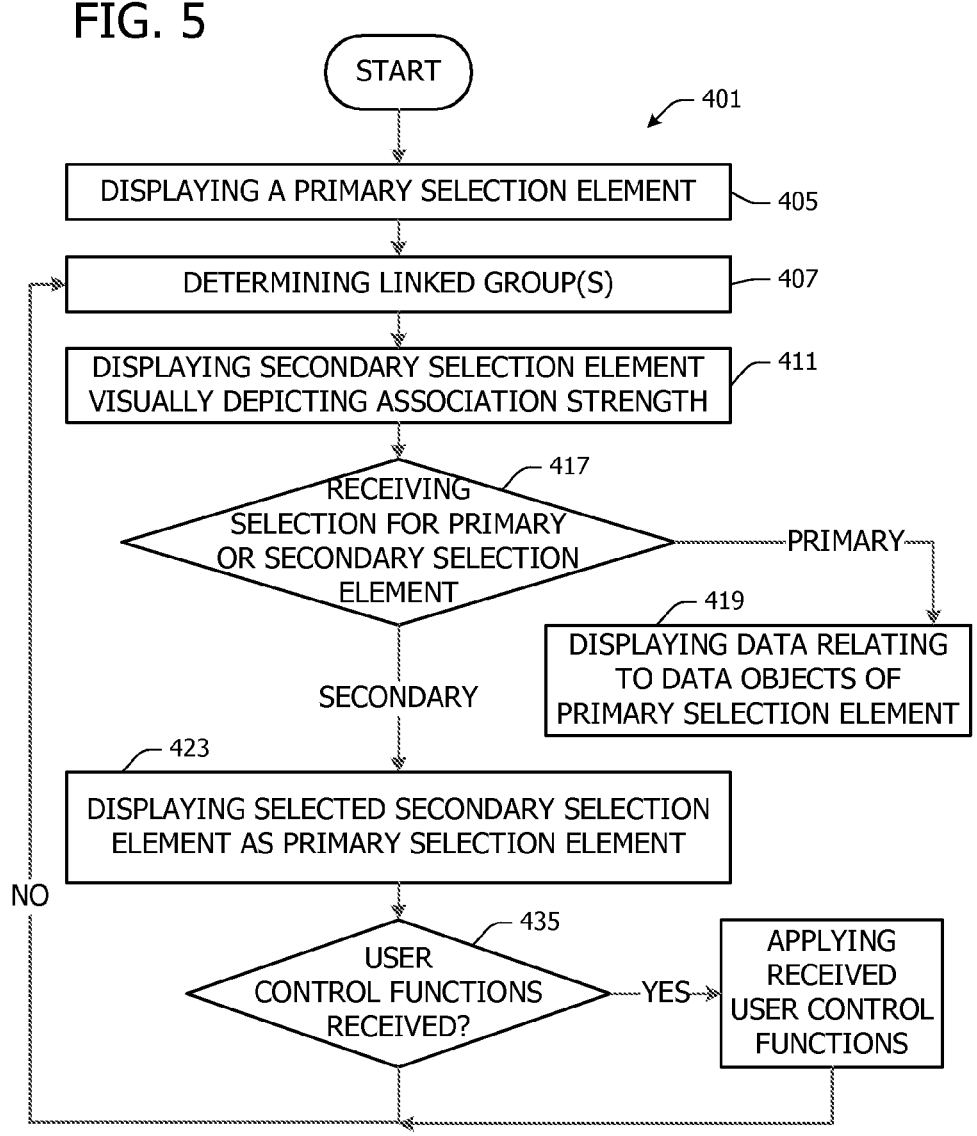
FIG. 5 is another flow diagram of a method of another embodiment of the invention.
Figure 6:
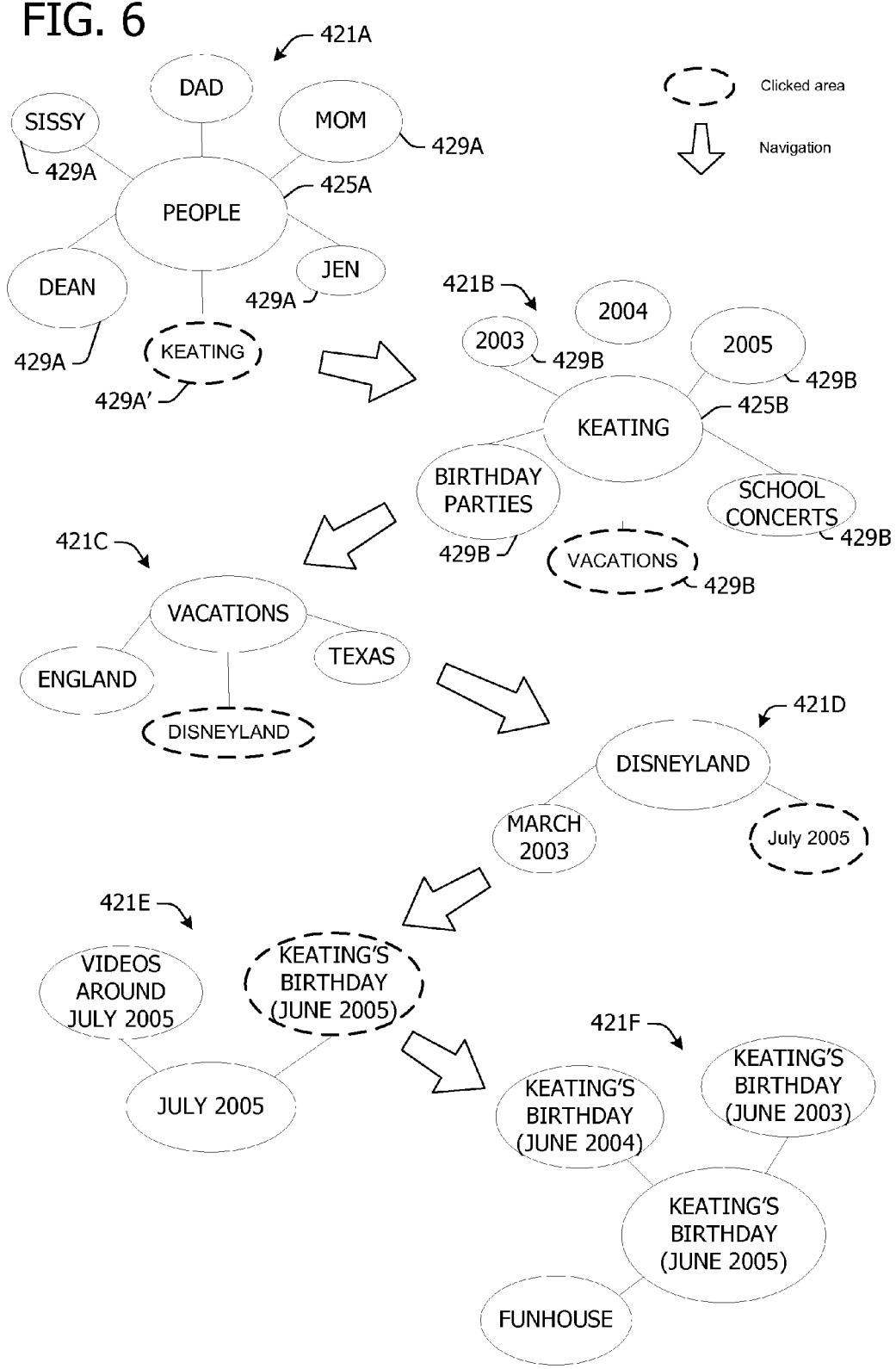
FIG. 6 depicts a series of user interfaces utilized according to the method of FIG. 5.

Referring now to FIG. 5, a method for navigating a data collection containing a plurality of data objects is generally indicated 401. Reference will also be made periodically to FIG. 6, which depicts a series of user interfaces, generally indicated 421A-421F, utilized according to the method of FIG. 5. The method 401 comprises displaying, at 405, a primary selection element associated with a selected group of data objects from the data collection. With reference to FIG. 6, a primary selection element 425A associated with "PEOPLE" is shown.

The method 401 continues by determining, at 407, at least one other group of data objects linked with the selected group based upon the data objects of the selected group and the data objects of the other group. Such links can be determined 407 by comparing metadata associated with the data objects of the selected group of data objects with the metadata associated with the at least one other group of data objects of the data collection.

The method 401 further displays, at 411, a secondary selection element associated with the other group of data objects linked with the selected group. Referring again to FIG. 6, for example, multiple secondary selection elements 429A are depicted surrounding the primary selection element 425A. For example, the secondary selection elements 429A are displayed in a manner visually depicting the relative strength of the association of the data objects with the data objects of the other group of the selected group. For example, the size of the secondary selection elements 429A depicted in FIG. 6 are indicative of the relative strength of association. In particular, the secondary selection elements 429A labeled "MOM" and "DEAN" are the largest, thereby indicating their relatively high association with one another. Conversely, the secondary selection element 429A labeled "JEN" is the smallest, thereby indicating its association with the primary selection element 425A, but at a level of association somewhat less than the larger secondary selection elements.

The method 401 further receives, at 417, the selection for the primary selection element 425A or for the secondary selection element 429A. In the case where the method 401 receives 417 the selection for the primary selection element 425A, the method continues by displaying, at 419, data associated with the contents of the selected group of data objects. In this manner, selection of the primary selection element 425A allows a user to view a display indicative of the contents of the primary group of data objects.

Alternately, in the case where the method 401 receives 417 the selection for the secondary selection element, the method continues by displaying, at 423, the selected secondary selection element 429A as the primary selection element 425A and repeating the determining 407 and displaying 411 processes discussed above for the newly selected primary selection element. In particular, the method 401 determines 407 other groups of data objects linked with the selected group of data objects based upon the data objects of the selected group and the data objects of the other groups. The method further displays 411 the secondary selection elements associated with the other groups of data objects. Again, each of the secondary selection elements is displayed 411 in a manner visually depicting the relative strength of the association of its data objects with the data objects of the selected group of data objects.

Referring again to FIG. 6, the foregoing process is easily illustrated. After displaying 405 the primary selection element 425A and displaying 411 the secondary selection elements 429A, the user is invited to select a selection element. In the example shown, the user selects 417 the "Keating" secondary selection element 429A', indicated by the dashed line. In response, the method 401 displays 423 the selected secondary selection element 429A' as the primary selection element 425B of user interface 421B. In other words, the method 401 promotes the selected secondary selection element 429A' to a primary selection element 425B of the next user interface 421B. Again, the method 401 determines 407 other groups of data objects linked with the selected group of data objects (e.g., Keating) and displays 411 secondary selection elements 429B associated with the other groups of data objects. This process continues throughout the remaining user interfaces 421C-421F as further selection of secondary selection elements 429 with each user interface triggers promotion of that secondary selection element to the next primary selection element. In this manner a user can browse though many data objects of a data collection beyond the typical hierarchical structure. This browsing process can be non-linear, functioning nearly as a stream of consciousness. Such a browsing experience can lead to interesting and more satisfying links between data objects.

In another exemplary embodiment, the determining 407 at least one other group of data objects linked with the selected group compares, also at 407, metadata associated with the data objects of the primary selection element 425A with metadata associated with the other data objects of the data collection. Once compared, the determining 407 other groups of data objects linked with the selected group further groups data objects from the data collection based upon metadata associated with the data objects.

Useful metadata that can be the subject of such comparisons can take any number of forms. In other words, any metadata associated with a data object may be utilized in the comparison and determination to help link groups of data objects. By utilizing a broad spectrum of data, links between groups of data objects can be established based upon many different parameters. For example, such data can include an image pattern of the data object where the data object is an image file or a portion of an image file, video content of the data object where the data object is a video file or a portion of a video file, audio content of the data object where the data object is an audio file or a portion of an audio file, a textual description of the data object, a keyword associated with the data object, a tag associated with the data object, a textual time code associated with the data object, a time associated with the data object, a textual date code associated with the data object, a date associated with the data object, a GPS (Global Positioning System) coordinate corresponding to where the data object was first created or collected, an address corresponding to where the data object was first created or collected, a size of the data object, a rating associated with the data object, a format of the data object, a type of file that the data object represents, a type of media where the data object is a media file, a storage location of the data object within the data collection, copyright information associated with the data object, authorship information associated with the data object, device information associated with the creation of the data object, digital media rights information associated with the data object, an initial source of the data object, an intended audience of the data object, an expiration date associated with the data object, a broadcast window associated with the data object, a cost of owning or obtaining access rights to the data object, a ratecard associated with the data object, and a relevance score associated with the data object, among others. The foregoing list is not meant to be exhaustive, but is rather an exemplary list of metadata sources that may be used as a starting point for such comparison and determination processes.

In a further alternative embodiment, the comparing 407 metadata associated with the data objects of the primary selection element with metadata associated with other data objects of the data collection comprises calculating, also 407, strength of association scores of the compared data objects. Calculating strength of association scores can be accomplished via any number of methods known in the art, such as data clustering and Bayesian algorithms.

In still another alternative embodiment, the method 401 comprises receiving, at 435, control functions for controlling the calculating the strength of association scores. Such received 435 control functions can be take many forms, such as receiving a priority order of data objects for analysis, a granularity selection for the data analysis, or a particular metadata for use in the calculation. Such received 435 control functions are then applied, at 437, before the determining 407 and displaying 411 processes.

In yet another alternative embodiment, the method 401 may further display links between groups of data objects as part of the displaying 411 process. In particular, displaying 411 the links between groups of data objects can comprise displaying the links in a manner visually depicting further information regarding the links themselves. For example, the relative strength of the links or the rationale for the links between the groups of data objects can be depicted. In still another exemplary embodiment, a parameter independent of the basis for the links themselves can be included. For instance, the links may be established due to the similarity of metadata of the data objects, but the visual depiction of the links may illustrate another feature entirely. For example, the length of the link depicted can depict the average difference in time between the formation of one group of data objects and another group of data objects.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A method for navigating a data collection containing a plurality of data objects, said method comprising:
   (i) displaying one or more categorical selection elements associated with one or more primary selection elements, wherein each primary selection element is associated with a selected group of data objects contained in the data collection, said primary selection element including a primary selection element identifier for identifying the selected group of data objects;
   (ii) receiving a selection of one or more categorical selection elements;
   (iii) displaying the one or more primary selection elements associated with the one or more selected categorical selection elements;
   (iv) determining at least one other group of data objects contained in the data collection linked with the selected group of data objects based upon the data objects of the selected group and the data objects of the other group, wherein said determining comprises comparing metadata associated with the data objects of the selected group with metadata associated with other data objects contained in the data collection to determine relative associations between the data objects of the selected group associated with the second selection element and the data objects of the selected group associated with the primary selection element;
   (v) displaying a secondary selection element associated with the other group of data objects linked with the selected group of data objects, said secondary selection element including a secondary selection element identifier for identifying the other group of data objects, said secondary selection element being displayed in a manner visually depicting a relative strength of the association of the data objects of the other group with the data objects of the selected group, wherein the relative strength of the association is visually depicted via the displayed size of the secondary selection element, wherein the second selection element identifier and the primary selection element identifier indicate a relationship between the selected group of data objects and the other group of data objects;
   (vi) displaying links between groups of data objects in a manner visually depicting at least one of a relative strength of the links, a rationale for the links between the groups of data objects, and a parameter independent of the basis for the links, said links being representative of the relative associations between the groups of data objects;
   (vii) receiving a selection for the primary selection element or for the secondary selection element;
   (viii) upon receiving the selection for the primary selection element, displaying data associated with the contents of the selected group of data objects, and
   (ix) upon receiving the selection for the secondary selection element,
      displaying the selected secondary selection element as the primary selection element, and
      repeating processes (iv) and (v) for the selected primary selection element.

2. A method as set forth in claim 1 wherein said determining other groups of data objects linked with the selected group further comprises grouping data objects from said data collection based upon metadata associated with the data objects.

3. A method as set forth in claim 1 wherein said comparing metadata comprises comparing at least one of an image pattern of the data object where the data object is an image file or a portion of an image file, video content of the data object where the data object is a video file or a portion of a video file, audio content of the data object where the data object is an audio file or a portion of an audio file, a textual description of the data object, a keyword associated with the data object, a tag associated with the data object, a textual time code associated with the data object, a time associated with the data object, a textual date code associated with the data object, a date associated with the data object, a GPS (Global Positioning System) coordinate corresponding to where the data object was first created or collected, an address corresponding to where the data object was first created or collected, a size of the data object, a rating associated with the data object, a format of the data object, a type of file that the data object represents, a type of media where the data object is a media file, a storage location of the data object within the data collection, copyright information associated with the data object, authorship information associated with the data object, device information associated with the creation of the data object, digital media rights information associated with the data object, an initial source of the data object, an intended audience of the data object, an expiration date associated with the data object, a broadcast window associated with the data object, a cost of owning or obtaining access rights to the data object, a ratecard associated with the data object, and a relevance score associated with the data object.

4. A method as set forth in claim 1 wherein said comparing metadata associated with the data objects of the primary selection element with metadata associated with other data objects of the data collection comprises calculating strength of association scores of the compared data objects.

5. A method as set forth in claim 4 wherein said calculating strength of association scores comprises calculating scores by using at least one of data clustering and Bayesian algorithms.

6. A method as set forth in claim 4 further comprising receiving from a user control functions for controlling the calculating the strength of association scores.

7. A method as set forth in claim 6 wherein said receiving control functions comprises receiving at least one of a priority order of data objects for analysis, a granularity selection of the data analysis, and a particular metadata for use in the calculation.

8. A method of linking data objects of a data collection, said method comprising:
   displaying one or more categorical selection elements associated with one or more primary selection elements, wherein each primary selection element is associated with a selected group of data objects contained in the data collection;

displaying one or more filter elements for filtering data objects in the data collection;

receiving a selection of one or more of the displayed categorical selection elements;

displaying the one or more primary selection elements associated with the one or more selected categorical selection elements;

receiving instructions to display data objects of the data collection, said instructions being in the form of instructions to display, based on a user selection of one of the displayed one or more primary selection elements, the selected group of data objects that said selected primary selection element is associated with, or to specify a filter for filtering the data objects of the data collection based on a user selection of the filter elements;

where said instructions are in the form of instructions to navigate to the selected group of data objects, identifying one or more other groups of data objects of the data collection linked with the selected group of data objects, wherein said linking comprises comparing metadata associated with the data objects of the selected group of data objects with the metadata associated with other data objects of the data collection to determine a relative association between the data objects of the selected group of data objects and the other data objects of the data collection, and calculating a strength of association score associated with each of the data objects of the identified one or more other groups relative to each of the data objects of the selected group, wherein said calculated strength of association score assesses the strength of association between each of the data objects of the identified one or more other groups relative to each of the data objects of the selected group;

where said instructions are in the form of instructions to specify a filter for filtering the data objects of the data collection based on the user selection of the filter elements, determining a group of data objects specified by said user selection of the filter elements;

calculating a strength of association score associated with each of the filtered data objects in the group of data objects; and displaying data associated with the data objects for linking the data objects of the data collection based upon the calculated strength scores, wherein said linking comprises comparing metadata associated with the data objects of the selected group of data objects with the metadata associated with the other data objects of the data collection to determine the relative association between the data objects of the selected group of data objects and the other data objects of the data collection.

9. A method as set forth in claim 8 wherein said displaying data associated with the data objects further comprises determining the size of a display where the data associated with the data objects will be displayed and displaying data associated with only those data objects that can be displayed upon the display according to a readability criteria.

10. A method as set forth in claim 8 wherein said displaying data associated with the data objects further comprises displaying data associated with those data objects with the highest strength scores.

11. A method as set forth in claim 8 wherein said displaying data associated with the data objects comprises displaying data in a three-dimensional user interface.

12. A method as set forth in claim 8 wherein said displaying data associated with data objects comprises displaying the data associated with the data objects in clusters according to their respective group or filter.

13. A method as set forth in claim 12 further comprising displaying the strength scores of the data objects with a visual indicator associated with at least one of the groups, the filter, and the data objects.

14. A method as set forth in claim 13 wherein the size of the visual indicator is indicative of the calculated strength score.

15. A method as set forth in claim 8 further comprising calculating a selected group strength score based upon the combined strength of the data objects of the selected group of data objects; and calculating a group strength score for each of the linked groups of data objects based upon the combined strength of the data objects associated with respective linked groups of data objects.

16. A user interface for displaying data associated with a portion of data objects of a data collection, said user interface comprising:

one or more categorical selection elements associated with one or more primary selection elements, wherein each primary selection element is associated with a selected group of data objects of the data collection, said primary selection element including a primary selection element identifier for identifying the selected group of data objects, wherein the user interface permits a user selection of one or more categorical selection elements, said user interface displaying one or more primary selection elements associated with the one of more selected categorical selection elements;

one or more secondary selection elements associated with other groups of data objects of the data collection, each of said secondary selection elements including a secondary selection element identifier for identifying the other group of data objects, wherein each of the second selection element identifiers and the primary selection element identifier indicates a relationship between the selected group of data objects and the other group of data objects, each of said secondary selection elements being displayed in a manner visually depicting a relative strength of the association of its data objects with the data objects of the selected group of data objects, wherein the relative strength of the association is visually depicted via the displayed size of the secondary selection element, wherein said association between the other data objects of the data collection and the data objects of the selected group of data objects is determined by comparing metadata associated with the data objects of the selected group of data objects with metadata associated with other data objects of the data collection; and one or more links between the primary selection element and the one or more secondary selection elements displayed in a manner visually depicting the association defined by the link.

* * * * *

UNITED STATES PATENT AND TRADEMARK OFFICE
CERTIFICATE OF CORRECTION

| | | |
|---|---|---|
| PATENT NO. | : 7,792,868 B2 | |
| APPLICATION NO. | : 11/558869 | |
| DATED | : September 7, 2010 | |
| INVENTOR(S) | : Charles A. Finkelstein et al. | |

It is certified that error appears in the above-identified patent and that said Letters Patent is hereby corrected as shown below:

In column 13, line 48, in Claim 8, after "the" delete "filtered".

Signed and Sealed this
Tenth Day of May, 2011

David J. Kappos
*Director of the United States Patent and Trademark Office*